(12) United States Patent
Garcia

(10) Patent No.: US 6,789,908 B2
(45) Date of Patent: Sep. 14, 2004

(54) CONFOCAL ELLIPSOIDAL MIRROR SYSTEM FOR WIDE FIELD OF VIEW IMAGING

(75) Inventor: Daniel F. Garcia, Inyokern, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 82 days.

(21) Appl. No.: 10/359,376

(22) Filed: Feb. 7, 2003

(65) Prior Publication Data

US 2004/0156132 A1 Aug. 12, 2004

(51) Int. Cl.$^7$ ............................ G02C 5/10; G02B 17/02
(52) U.S. Cl. ........................................ 359/859; 858/728
(58) Field of Search ................................ 359/365, 366, 359/367, 725, 728, 729, 730, 731, 850, 858, 859

(56) References Cited

U.S. PATENT DOCUMENTS

| | | | | |
|---|---|---|---|---|
| 2,755,374 A | * | 7/1956 | Ott et al. ..................... | 362/247 |
| 3,802,767 A | * | 4/1974 | Rambauske ................. | 359/853 |
| 3,950,079 A | * | 4/1976 | Rambauske ................. | 359/226 |
| 4,003,639 A | * | 1/1977 | McFarland et al. ......... | 359/859 |
| 4,037,943 A | | 7/1977 | Anzai | |
| 4,265,510 A | * | 5/1981 | Cook .......................... | 359/366 |
| 4,566,763 A | | 1/1986 | Greguss | |
| 4,598,981 A | * | 7/1986 | Hallam et al. .............. | 359/366 |
| 5,173,801 A | * | 12/1992 | Cook .......................... | 359/365 |
| 5,473,474 A | * | 12/1995 | Powell ........................ | 359/725 |
| 5,550,672 A | * | 8/1996 | Cook .......................... | 359/365 |
| 5,574,601 A | * | 11/1996 | Hall ............................ | 359/859 |
| 6,495,839 B1 | * | 12/2002 | Dinger .................... | 250/492.2 |
| 6,611,282 B1 | * | 8/2003 | Trubko et al. ................ | 348/36 |

OTHER PUBLICATIONS

V.A. Panov, et. al , "Microobjectives with Two Ellipsoidal Reflecting Surfaces" Soviet J. Optical Techn., vol. 37, No. 11, pp. 721–725, Nov. 1970.*

Cesare Barbieri et al., "The Wide Angle Camera of teh ROSETTA Mission", description of flight model delivered for integration in Dec., 2001. downloaded from the internet Jun. 18, 2004.*

Rahul Swaminathan, et al., "Caustics of Catadioptric Cameras", Proc. IEEE Int'l Conf. on Computer Vision, Van Couver, Canada, Jul. 2001.*

Simon Baker, et al., "A Theory of Catadiotric Image Formation", Proc. 6$^{th}$ Int'l Conf. on Computer Vision, Bombay, India, Jan. 1998.*

Shree K. Nayar, et al. "Folded Catadioptric Cameras", Proc. IEEE Conf. on Computer Vision and Pattern Recognition, Fort Collins, Jun. 1999.*

* cited by examiner

*Primary Examiner*—John Juba, Jr.
(74) *Attorney, Agent, or Firm*—David Kalmbaugh

(57) ABSTRACT

An optical system having a pair of ellipsoidal shaped reflective surfaces or mirrors which receive light from an object and provide wide field view imaging for the object. The optical system directs the light onto a flat detector to a record a wide field of view image of the object on the flat detector.

20 Claims, 3 Drawing Sheets

CONFOCAL ELLIPSOIDAL MIRROR SYSTEM FOR WIDE FIELD OF VIEW IMAGING

BACKGROUND OF THE INVENTION

1. Field of the Invention

The present invention relates generally to optical systems for image viewing. More particularly, the present invention relates to an optical system which utilizes a pair of ellipsoidal reflective surfaces to provide for wide field of view imaging.

2. Description of the Prior Art

Currently, wide field of imaging optics are used for a multitude of purposes including photographic, remote sensing and space surveillance imaging. Generally, wide field of view imaging systems are refractive or catadioptric, and thus suffer from chromatic aberration and are generally to heavy for applications such as space surveillance.

Reflective optics do not suffer the drawbacks of refractive optics. Wide field of view imaging systems, however, share a common problem which is field curvature. This prevents a user from having the image sensed by a flat detector such as focal plane array or photographic film. In addition existing reflective wide field of view imaging systems are complex in nature requiring multiple mirrors to implement the system.

An example of a prior art wide field of view optical system is disclosed in U.S. Pat. No. 4,566,763 for a "Panoramic Imaging Block For Three-Dimensional Space", which issued Jan. 26, 1986. Disclosed in U.S. Pat. No. 4,566,763 is a wide field of view optical system which is suitable for pictorial recording and displaying based on a flat cylindrical perspective and reflective and refractive surfaces.

Another example of a prior art wide field of view optical system is disclosed in U.S. Pat. No. 4,037,943 for a "Reflection Type Image Forming Optical System Having A Large Angle Of View". Disclosed in U.S. Pat. No. 4,037,943 is a reflective type image forming optical system having a large angle of view which includes a convex mirror for reflecting incident light and a concave mirror. The convex mirror is disposed with its reflecting surface facing the reflective surface of the convex mirror. The concave mirror is arranged so that the distance between the center of curvature of the convex mirror and the center of curvature of the concave mirror is greater than half the radius of curvature of the concave mirror. There is also a stop disposed between the reflecting surfaces of the convex and concave mirrors.

While the foregoing prior art wide field of view optical systems are fairly effective, there are still drawbacks with these systems including chromatic aberration, weight problems and complexity in design.

Accordingly, there is a need for a relatively simple in design optical system which uses less than three mirrors to provide a high resolution wide field of view. In addition, the optical system should provide for a means whereby an image sensed by a flat detector such as focal plane array or photographic film is recorded by the flat detector.

SUMMARY OF THE INVENTION

The present invention overcomes some of the disadvantages of the prior art including those mentioned above in that it comprises a relatively simple optical system which includes a pair of mirror for receiving light from an object and directing the light onto a flat detector to record a wide field of view image of the object on the flat detector. The flat detector may be, for example, a photographic film.

The optical system of the present invention is a two reflective surface optical system for imaging a wide field of view scene and recording the scene on a flat detector. The optical system utilizes a pair of ellipsoidal reflective surfaces or mirrors with different eccentricities such that the ellipsoidal reflective surfaces have shared foci or foci in close proximity to one another. Light from a wide field of view scene is reflected from the reflective surface of the first ellipsoid forming a virtual image near one of the shared foci. The reflected light is then directed toward the reflective surface of the second ellipsoid and is reflected from this surface forming a real image near the other shared foci. The elliptical shape of the second reflective surface directs light from the virtual image near one of the shared foci directing the light near the other shared foci.

In the optical system of the present invention, the first reflective surface is convex and the second reflective surface is concave.

DETAILED DESCRIPTION OF THE PROFFERED EMBODIMENT

Figure 1:
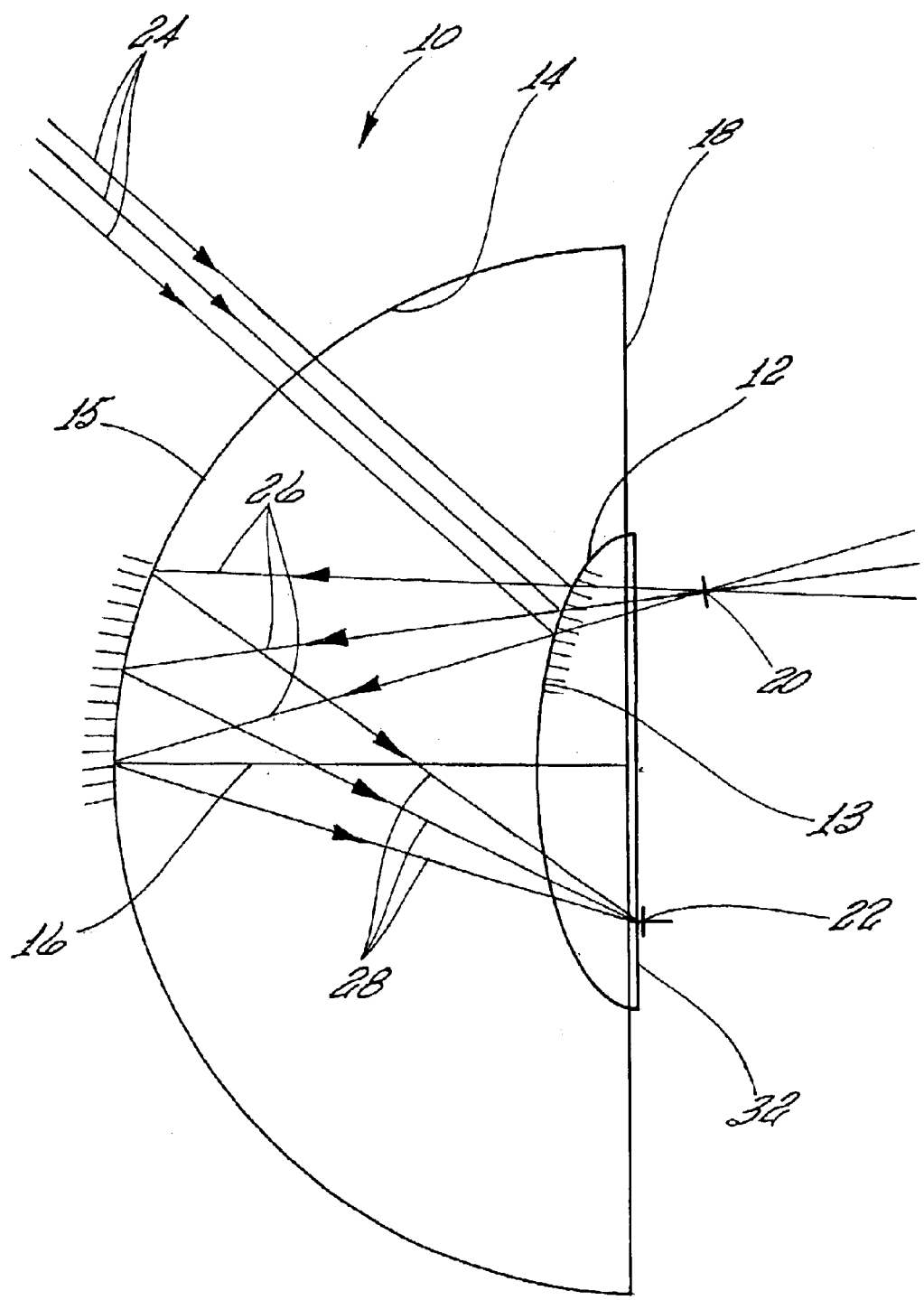
FIGS. 1, 2 and 3 are schematic diagrams of a preferred embodiment of the present invention wherein a pair of elliptical shaped reflective surface for wide field of view imaging.

Referring to FIG. 1, there is shown an optical system, designated generally by the reference numeral 10, which is an all reflective, two mirror design capable of imaging a field of view 90° in azimuth and 25° to 75° in elevation. The optical system 10 includes a first elliptical shaped reflective surface 12 with surface 12 being convex and a second elliptical shaped reflective surface 14 with surface 14 being concave. Surfaces 12 and 14 form oblate ellipsoids 13 and 15, respectively. Oblate ellipsoids 13 and 15 are ellipses rotated about a minor axis 16. The ellipsoids 13 and 15 share a common minor axis 16 which is the optical axis for the optical system 10.

The reflective surfaces 12 and 14 may be, for example, mirrors which reflect incoming light from a wide field of view scene or other object. Aluminum may be used for the mirror surface of each mirror and may be shaped with a diamond turning machine.

When there is a rotation about minor axis 16, the foci of the ellipsoids 13 and 15 each trace out a circle or ring which is centered about minor axis 16 and lies in the major axis plane of the ellipsoids. The major axis for ellipsoids 13 and 15 is identified by the reference numeral 18. The real image 22 is recorded on a flat detector 32 which may photographic film or a focal plane array.

The eccentricities of the two ellipsoids 12 and 14 are chosen such that their ring foci are overlapping or nearly overlapping. When light (represented by parallel light rays 24) from an object reflects from the reflective surface 12 of ellipsoid 13 a virtual image 20 is created in proximity to one of the shared ring foci as shown in FIG. 1. The reflected light from surface 12 (represented by light rays 26) then reflect from surface 14 (represented by light rays 28) forming a real image 22 in proximity to the other shared foci.

The elliptical shape of reflective surface 14 directs light from the virtual image 20 near one of the foci imaging it to form the real image near the other foci. The light rays of the object first diverge from reflective surface 12 and then converge from reflective surface 14 in the manner illustrated in FIG. 1.

Mirror surface 12 may be defined by the following sag equation:

$$z_1 = \frac{1}{K_1 + 1}\left[r_1 - \sqrt{r_1^2 - (K_1 + 1)S^2}\right] \quad (1)$$

where
$K_1$ is the conic constant for ellipsoid 13
$r_1$ is the radius of curvature for ellipsoid 13
$S^2 = x^2 + y^2$ (x and y are transverse coordinates)
In a like manner, mirror surface 14 may be defined by the same equation as follows:

$$z_2 = \frac{1}{K_2 + 1}\left[r_2 - \sqrt{r_2^2 - (K_2 + 1)S^2}\right] \quad (2)$$

where
$K_2$ is the conic constant for ellipsoid 15
$r^2$ is the radius of curvature for ellipsoid 15
$S^2 = x^2 + y^2$ (x and y are transverse coordinates)
In the above equation x and y are lateral dimensions for a coordinate system where the z dimension for the coordinate system corresponds to the optical axis and the axis of revolution for mirrors 13 and 15.

The distance d between ellipsoids 13 and 15 is set forth by the following equation:

$$d \cong \frac{r_2^2(K_1 + 1)^2 - r_1^2(K_2 + 1)^2}{r_2(K_1 + 1)^2(K_2 + 1)^{3/2} + r_1(K_2 + 1)^2(K_1 + 1)^{3/2}} \quad (3)$$

It should be noted that the distance d provided by equation 3 is an approximation.

The optical system 10 comprising the present invention may be used for a wide range of imaging applications. Optical system 10 may be manufactured as a single piece injection molded plastic device with its mirror surfaces coated with a reflective material. The optical system 10 would therefore be lightweight and inexpensive to fabricate. Since it is an all reflective optical system it also has the capability of operating over a portion of the light spectrum from ultraviolet light to infrared light.

In a preferred embodiment optical system 10 has a field of view of 90° in azimuth and 25° to 75° in elevation. Optical System 10 has an F# of approximately 1.7 with an effective focal length of 10.2 mm and an entrance pupil diameter of 6 mm. The total length of the imaging module (from the reflective surface 14 of mirror 15 to the image plane 22 is 25 mm.

The diameter of the convex mirror 13 is 18.27 mm and the diameter of the concave mirror 15 is approximately 18 mm. The distance d between mirrors 13 and 15 is 16.03 mm. The value of K for the convex mirror 13 is 6.375 and the value of K for the concave mirror 15 is 2.33. The value of r for the convex mirror 13 is 28.616 mm and the value of r for the concave mirror 15 is −56.316 mm.

Figure 2:
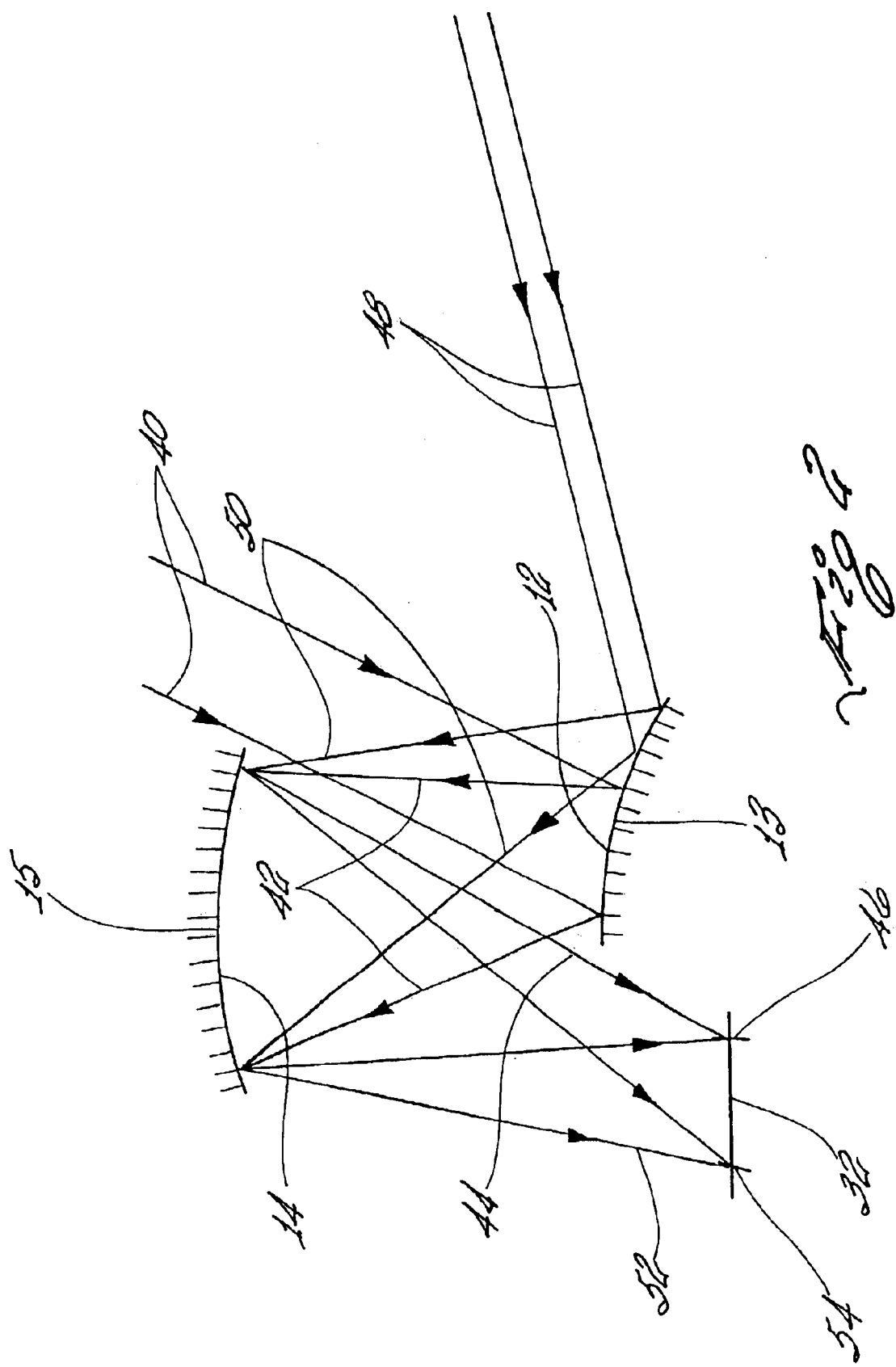

Referring to FIG. 2, there is shown light rays from multiple objects which may be located in one scene being processed by optical system 10. Light represented by parallel light rays 40 from a first object in a scene first reflects from the reflective surface 12 of mirror 13 as shown in FIG. 1. The reflected light from surface 12 (represented by light rays 42) then reflects from surface 14 of mirror 15 (represented by light rays 44) forming a real image 46 of the first object which is recorded on the flat detector 32 which may be photographic film or a focal plane array.

In a like manner, light represented by parallel light rays 48 from a second object in a scene first reflects from the reflective surface 12 of mirror 13 as shown in FIG. 1. The reflected light from surface 12 (represented by light rays 50) then reflects from surface 14 of mirror 15 (represented by light rays 52) forming a real image 54 of the second object which is recorded on the flat detector 32, Thus, it can be seen that multiple objects from a wide field of view scene can be recorded on photographic film or the like using the optical system 10 illustrated in FIGS. 1 and 2.

Figure 3:
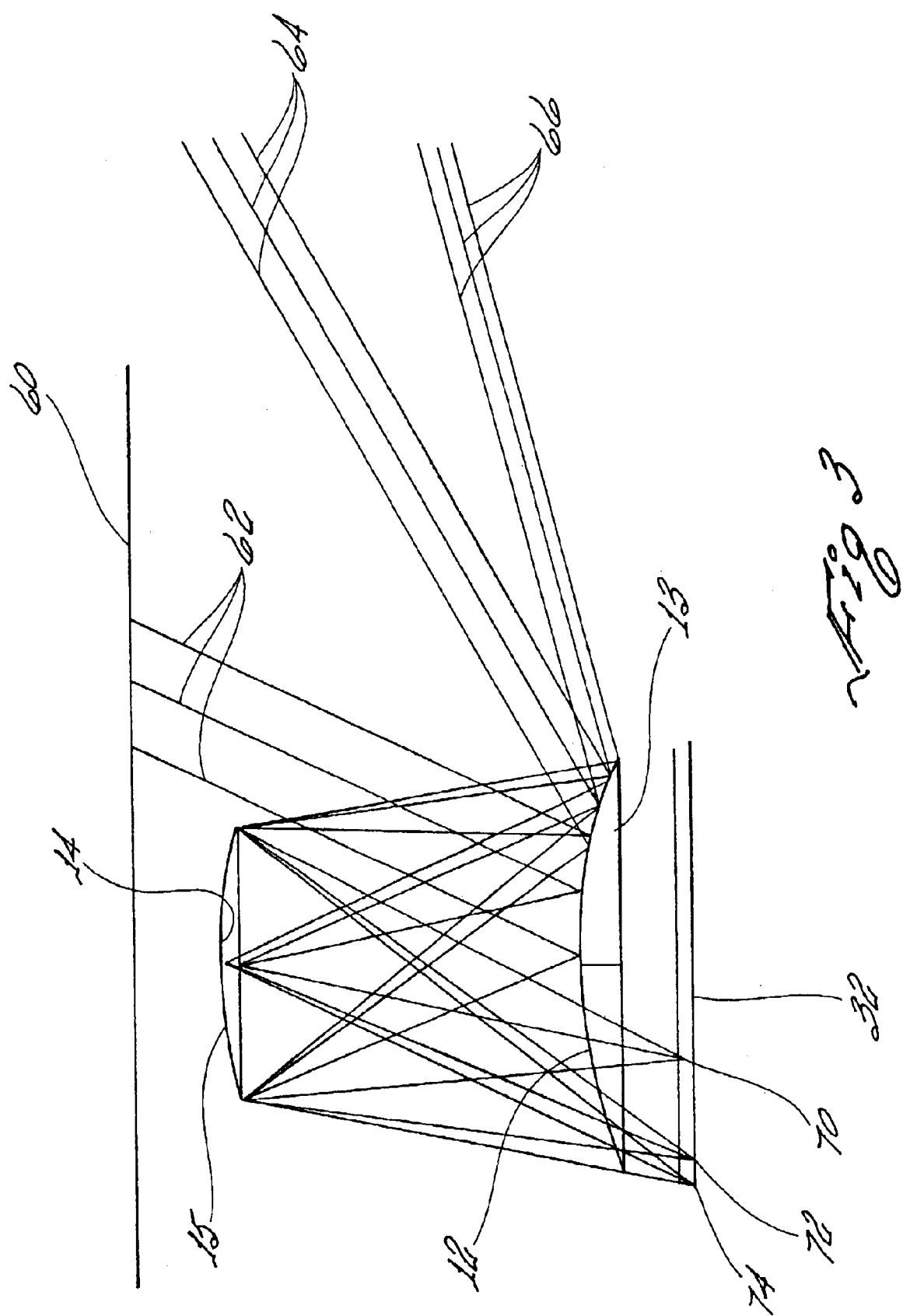

Referring to FIG. 3, there is a wide field of view scene 60 which generates parallel light 62, 64 and 66 from multiple objects within scene 60. The parallel light rays 62, 64 and 66 are first directed to reflected surface 12 and reflected from surface 12 to reflective surface 14. Reflective surface 14 then directs the light rays 62, 64 and 66 to flat detector 32 where multiple real images 70, 72 and 74. The multiple objects from the wide field of view scene 60 are then recorded on the flat detector 32 which again may be photographic film or a focal plane array.

From the foregoing, it may readily be seen that the present invention comprises a new, unique and exceedingly useful confocal ellipsoidal mirror system for wide field of view imaging which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A confocal ellipsoidal mirror system for wide field of view imaging comprising:
   (a) an ellipsoidal convex mirror having a minor axis and a reflective surface;
   (b) an ellipsoidal concave mirror having a minor axis and a reflective surface wherein said convex mirror is disposed a predetermined distance d from said concave mirror along a common minor axis which comprises the minor axis of said convex mirror and the minor axis of said concave mirror;
   (c) said convex mirror receiving substantially collimated light rays from an object positioned in a wide field of view scene and then directing said light rays to said concave mirror; and
   (d) said concave mirror receiving said light rays from said convex mirror and then directing said light rays to a flat detector located in proximity to a major axis plane for said convex mirror, said flat detector upon receiving said light rays from said concave mirror forming a real image of said object thereon, said flat detector recording said real image of said object.

2. The confocal ellipsoidal mirror system of claim 1 wherein said convex mirror and said concave mirror are each fabricated from aluminum.

3. The confocal ellipsoidal mirror system of claim 1 wherein said predetermined distance d between said convex mirror and said concave mirror is approximately 16.03 mm.

4. The confocal ellipsoidal mirror system of claim 1 wherein said convex mirror and said concave mirror provide imaging for field of view of 90° in azimuth and 25° to 75° in elevation.

5. The confocal ellipsoidal mirror system of claim 1 wherein said flat detector comprises photographic film.

6. A confocal ellipsoidal mirror system for wide field of view imaging comprising:
   (a) a first ellipsoid having a minor axis and a convex reflective surface;

(b) a second ellipsoid having a minor axis and concave reflective surface wherein said first ellipsoid is disposed a predetermined distance d from said second ellipsoid along a common minor axis which comprises the minor axis of said first ellipsoid and the minor axis of said second ellipsoid;

(c) said first ellipsoid being defined the following equation:

$$z_1 = \frac{1}{K_1+1}\left[r_1 - \sqrt{r_1^2 - (K_1+1)S^2}\right] \quad (1)$$

where $K_1$ is a conic constant for said first ellipsoid;
$r_1$ is a radius of curvature for said first ellipsoid; and
$S^2 = x^2 + y^2$ (d) said second ellipsoid being defined by the following equation:

$$z_2 = \frac{1}{K_2+1}\left[r_2 - \sqrt{r_2^2 - (K_2+1)S^2}\right] \quad (2)$$

where $K_2$ is a conic constant for said second ellipsoid;
$r_2$ is a radius of curvature for said second ellipsoid; and
$S^2 = x^2 + y^2$ where x and y in equations (1) and (2) are lateral dimensions for a coordinate system in which a z dimension for the coordinate system corresponds to said common minor axis; and (e) said distance d between said first ellipsoid and said second ellipsoid being defined by the following equation:

$$d \cong \frac{r_2^2(K_1+1)^2 - r_1^2(K_2+1)^2}{r_2(K_1+1)^2(K_2+1)^{3/2} + r_1(K_2+1)^2(K_1+1)^{3/2}}. \quad (3)$$

7. The confocal ellipsoidal mirror system of claim 6 wherein said first ellipsoid comprises a convex mirror and said second ellipsoid comprises a concave mirror.

8. The confocal ellipsoidal mirror system of claim 7 wherein said convex mirror and said concave mirror are each fabricated from aluminum.

9. The confocal ellipsoidal mirror system of claim 7 wherein said predetermined distance d between said first ellipsoid and said second ellipsoid approximately 16.03 mm.

10. The confocal ellipsoidal mirror system of claim 9 wherein the value of K for said first ellipsoid is 6.375 and the value of K said second ellipsoid is 2.33.

11. The confocal ellipsoidal mirror system of claim 10 wherein the value of r for said first ellipsoid is 28.616 mm and the value of r for said second ellipsoid is −56.316 mm.

12. The confocal ellipsoidal mirror system of claim 11 wherein said first ellipsoid and said second ellipsoid provide imaging for a field of view of 90° in azimuth and 25° to 75° in elevation.

13. A confocal ellipsoidal mirror system for wide field of view imaging comprising:

(a) an ellipsoidal convex mirror having a minor axis and a reflective surface;

(b) an ellipsoidal concave mirror having a minor axis and a reflective surface wherein said convex mirror is disposed a predetermined distance d from said concave mirror along a common minor axis which comprises the minor axis of said convex mirror and the minor axis of said concave mirror;

(c) said convex mirror being defined by the following equation:

$$z_1 = \frac{1}{K_1+1}\left[r_1 - \sqrt{r_1^2 - (K_1+1)S^2}\right] \quad (1)$$

where $K_1$ is a conic constant for said convex mirror;
$r_1$ is a radius of curvature for said convex mirror; and
$S^2 = x^2 + y^2$ (d) said concave mirror being defined by the following equation:

$$z_2 = \frac{1}{K_2+1}\left[r_2 - \sqrt{r_2^2 - (K_2+1)S^2}\right] \quad (2)$$

where $K_2$ is a conic constant for said concave mirror;
$r_2$ is a radius of curvature for said concave mirror; and
$S^2 = x^2 + y^2$ where x and y in equations (1) and (2) are lateral dimensions for a coordinate system in which a z dimension for the coordinate system corresponds to said common minor axis; and (e) said distance d between said convex mirror and said concave mirror being defined by the following equation:

$$d \cong \frac{r_2^2(K_1+1)^2 - r_1^2(K_2+1)^2}{r_2(K_1+1)^2(K_2+1)^{3/2} + r_1(K_2+1)^2(K_1+1)^{3/2}} \quad (3)$$

(f) said convex mirror receiving substantially collimated light rays from an object positioned in a wide field view scene and then directing said light rays to said concave mirror;

(g) said concave mirror receiving said light rays from said convex mirror and then directing said light rays to a flat detector located in proximity a major axis plane for said convex mirror, said detector upon receiving said light rays from said concave mirror forming a real image of said object thereon, said flat detector recording said real image of said object.

14. The confocal ellipsoidal mirror system of claim 13, wherein said convex mirror and said concave mirror are each fabricated from aluminum.

15. The confocal ellipsoidal mirror system of claim 13 wherein said predetermined distance d between said convex mirror and said concave mirror is approximately 16.03 mm.

16. The confocal ellipsoidal mirror system of claim 15 wherein the value of K for said convex mirror is 6.375 and the value of K for said concave mirror is 2.33.

17. The confocal ellipsoidal mirror system of claim 16 wherein the value of r for said convex mirror is 28.616 mm and the value of r for said concave mirror is −56.316 mm.

18. The confocal ellipsoidal mirror system of claim 13 wherein said convex mirror and said concave mirror provide imaging for a field of view 90° in azimuth and 25° to 75° in elevation.

19. The confocal ellipsoidal mirror system of claim 13 wherein said flat detector comprises photographic film.

20. The confocal ellipsoidal mirror system of claim 13 wherein said detector comprises a focal plane array.

* * * * *